(No Model.)

M. TOMPKINS.
FRUIT ASSORTING AND CLEANING DEVICE.

No. 417,756. Patented Dec. 24, 1889.

WITNESSES:
John W. Fisher
Walter McLies

INVENTOR
Morris Tompkins
BY
Robert W. Hardie
ATTORNEY.

UNITED STATES PATENT OFFICE.

MORRIS TOMPKINS, OF GERMANTOWN, NEW YORK.

FRUIT ASSORTING AND CLEANING DEVICE.

SPECIFICATION forming part of Letters Patent No. 417,756, dated December 24, 1889.

Application filed July 13, 1889. Serial No. 317,490. (No model.)

*To all whom it may concern:*

Be it known that I, MORRIS TOMPKINS, a citizen of the United States, residing at Germantown, in the county of Columbia and State of New York, have invented a new and useful Fruit Assorting and Cleaning Device, of which the following is a specification.

The object of my invention is to provide suitable means whereby fruit and vegetables may be readily assorted, cleaned, and packed for transportation with as little handling and consequent injury to the same as possible.

The invention will first be described, and then pointed out in the claims.

Figure 1:
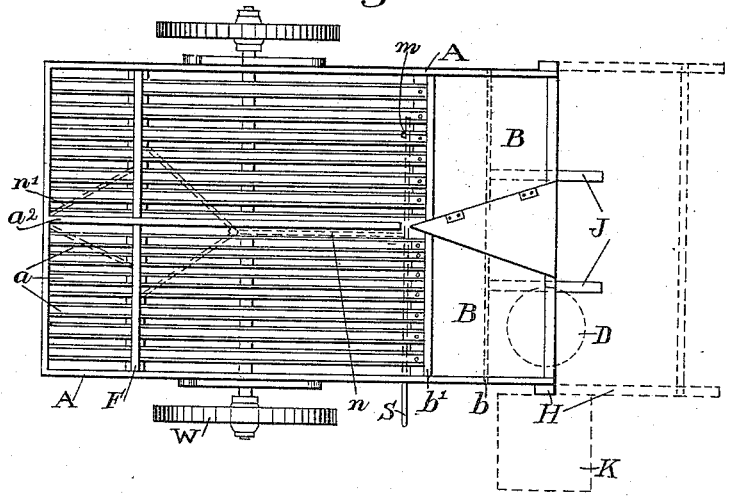
Figure 2:
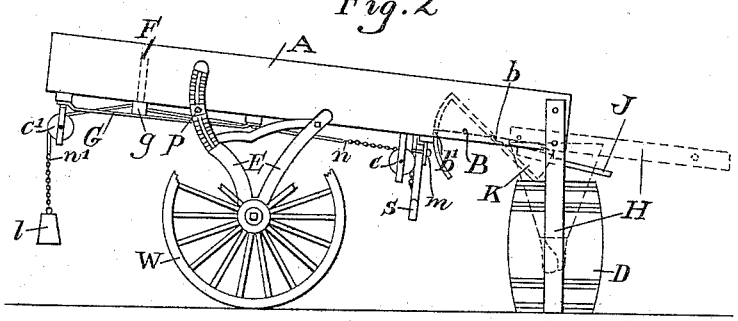
Figures 3, 4:
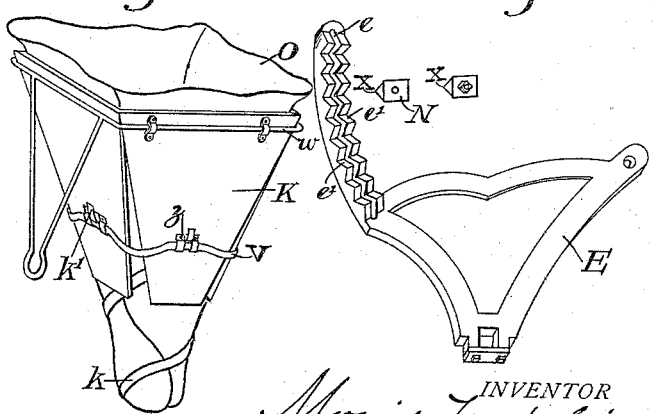

In the drawings, Figure 1 represents a plan view of a machine embodying my invention. Fig. 2 represents a side view of the same. Fig. 3 represents a perspective view of a receptacle for scouring the fruit. Fig. 4 represents an enlarged view of the standard supporting the upper end of the machine.

A represents a main frame, composed of sides and a table upon which the fruit is first deposited. The surface of the table is preferably composed of slats $a$, separated from each other, so as to form openings to allow dirt to pass through and fall to the ground. The sides of these slats are preferably made beveled, so as not to mar or injure the fruit, and also for the purpose of forming grooves which serve as means for conducting the fruit down to the lower end of the table. The table is inclined, so that the fruit deposited on its surface will roll down the inclined surface to the lower extremity of the table in front of the operator. A partition—such as is represented by $a^2$—may be placed in the center of the table, so as to provide two compartments by means of which two kinds of fruit may be handled at the same time.

B represents a shelf placed at the lower extremity of the table and pivoted upon the journal $b$. The end of the shelf which is nearest to the lower extremity of the table is provided with a flange $b'$, extending from the under surface of the shelf downward, so as to serve as a stop to prevent the fruit from falling to the ground when the shelf is tilted on its journal. If desired, a handle of any suitable construction, such as J, may be fastened to the shelf, preferably on the under side, so that it may be raised on its journal by hand.

I do not desire to be limited to the specific construction of the shelf shown herein, nor to any particular means for tilting the same.

When the fruit rolls down the inclined surface of the table, it is deposited upon the shelf in front of the operator. The good fruit may then be selected from the mass and the refuse remaining upon the table may be deposited in a barrel placed under the shelf by tilting the shelf on its journal.

E represents a bracket or standard which supports the forward end of the main frame. The lower extremity of this standard is secured to an axle supported upon wheels W. One of the upper ends of the standard is pivoted to the main frame. The other end is provided with an elongated slot $e$. Within said slot is a pin P, rigidly secured to the main frame. The side of this slotted end is provided with notches $e'$. A washer N, having two beveled sides meeting to form an edge X, corresponding to the notches formed in the end of the standard, is placed upon the pin P, with the edge $x$ within the notches of the standard, and secured in place by means of a nut engaging the threaded end of the pin P. The forward end of the table may be raised and its inclination varied by placing the edge of the washer in the upper notches of the standard and securing the same in position by means of the nut engaging the threaded end of the pin. Other means having similar capabilities may be used for varying the inclination of the table, without departing from my invention.

F represents a follower or platen, movable lengthwise of the table and supported upon a shaft $g$, having its ends movable in a slide G, secured to the lower surface of the table. This platen is provided with a chain or cord $n$, or other suitable means, whereby it may be moved forward by the operator and draw with it the mass of fruit should any obstruction impede its downward progress. The chain $n$ passes over a pulley $c$, and is connected to a lever S. This lever is pivoted at one end to the under surface of the table by means of the pin $m$. By pressing down on the free outer end of the lever S the platen is drawn forward. A weight $l$ or other suitable device may be connected with the platen for the purpose of drawing the platen back.

H represents standards, the upper ends of which are pivotally attached to and support the lower end of the frame. The lower ends of the standards may be elevated, so as to assume the position indicated by the dotted lines in Fig. 1, and serve as handles to draw the table from one part of the field to another.

K represents a receptacle attached to the side of the table for cleaning the fruit and dropping it into a barrel. This consists of a funnel-shaped box having its sides separately pivoted at their upper ends to a frame $w$, so that the lower extremities of the sides may be adjustable, and the diameter of the lower end of the box thereby contracted or enlarged. The inside of this box may be provided with a lining O—such as sheep-skin or sacking—to serve as a means for protecting the fruit against damage in striking against the sides of the box, and also as means for cleaning and polishing the fruit. A cord, or, preferably, an elastic band $k$, is secured to the lining, so as to contract the opening in the same to the required size. This band is preferably secured to the lining in a spiral line, so that the fruit in its descent will be revolved and its entire surface cleaned. A strap or band V is bound around the sides of the box and is held freely in place by means of loops $z$. By tightening or loosening said strap the lower ends of the sides may be drawn together or be free to be spread apart by the weight of the fruit in the box. The central portion of the loop $z$ is shown bent upward, forming a hook $k'$, by means of which a tube of cloth or leather may be secured to the outside of the box K, so as to envelop the lower end of the box and lead the fruit into a barrel or other receptacle.

What I claim as new, and desire to secure by Letters Patent, is—

1. In a fruit assorter and cleaner, the combination, with the main frame A, provided with slats $a$, of an assorting-shelf B, pivoted standards H, wheels W and their connecting-axle, washer N, and adjustable standards E, having two upwardly-extending arms, one of said arms being pivoted to the main frame and the other provided with notches $e'$ and longitudinal slot $e$, substantially as shown and described.

2. In a fruit-assorting device, a funnel-shaped box having its sides pivotally supported at their upper ends by a frame and the lower ends of the sides free to be separated or drawn together, and means for drawing the lower ends of said sides together, substantially as shown and described.

3. In a fruit-assorting device, a funnel-shaped box having its sides pivotally supported at their upper ends by a frame, and the lower ends of said sides free to be separated or drawn together and provided with means for drawing said sides together, in combination with a lining for said box provided with an elastic band for contracting the diameter of the lower part of said lining, substantially as shown and described.

MORRIS TOMPKINS.

Witnesses:
  EDMOND ROCKEFELLER, Jr.,
  WILLIAM H. ROCKEFELLER.